United States Patent [11] 3,622,560

[72] Inventors Nathan Chadwick Hindley
 Welwyn Garden City;
 Michael James O'Leary, Digswell, Welwyn,
 England; Niklaus Halder, Oberwill,
 Switzerland
[21] Appl. No. 816,875
[22] Filed Apr. 3, 1969
[45] Patented Nov. 23, 1971
[73] Assignee Hoffmann-La Roche Inc.
 Nutley, N.J.
[32] Priority Feb. 4, 1969
[33] Great Britain
[31] 5,861/69

[54] PREPARATION OF KETAL SUGARS
 15 Claims, No Drawings
[52] U.S. Cl. .................................................... 260/209 R
[51] Int. Cl. ....................................................... C07c 47/18
[50] Field of Search .......................................... 260/209,
 210, 209 R

[56] References Cited
 UNITED STATES PATENTS
 2,715,121 8/1955 Glen et al. .................... 260/209
 3,096,323 7/1963 Touey et al. .................. 260/209
 3,277,076 10/1966 Yotsuluka ..................... 260/209
 3,451,993 6/1969 Goshima et al. .............. 260/209

Primary Examiner—Lewis Gotts
Assistant Examiner—Johnnie R. Brown
Attorneys—Samuel L. Welt, Jon S. Saxe, Bernard S. Leon, William H. Epstein, Edward L. Mandell and George M. Gould ABSTRACT: Preparation of ketal sugars from sugars utilizing ferric chloride and ferric bromide as a catalyst.

PREPARATION OF KETAL SUGARS

BACKGROUND OF THE INVENTION

In the past, ketal sugars have been prepared by reacting the sugar with a ketone or aldehyde utilizing concentrated sulfuric acid as a catalyst. By this process, the ketal sugars such as 2,3:4,4,6-diacetone-L-sorbose, an important intermediate in the preparation of ascorbic acid (Vitamin C), have been obtained in direct yields of at most 70 percent.

A disadvantage of utilizing concentrated sulfuric acid in this reaction lies in the fact that large quantities of this acid must be utilized in order to produce the ketal sugar. The excess quantities of sulfuric acid in this reaction medium must then be neutralized with a suitable alkali in order that the resulting ketal be recovered. In the case of 2,3:4,6-diketal sorbose, any unneutralized acid will interfere in the subsequent conversion of this diketal to ascorbic acid. Furthermore, the neutralization step is both expensive and time-consuming, additionally creating a problem as to the disposal of large quantities of the salt produced by this neutralization.

SUMMARY OF THE INVENTION

In accordance with this invention, it has been found that when a sugar of the formula:

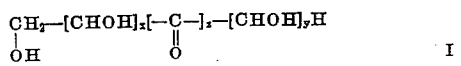    I wherein $x$ is an integer from 1 to 5, and $y$ and $z$ are integers from 0 to 1; is reacted with a ketone or aldehyde of the formula:

    II wherein $R_1$ and $R_2$ are selected from the group consisting of hydrogen, lower alkyl, aralkyl and aryl, and taken together form a lower alkylene radical, in the presence of small or catalytic quantities of ferric chloride or ferric bromide an equilibrium can be set up between the sugar of formula I and the ketone or aldehyde of formula II. This equilibrium can be displaced by water-removal procedures to give direct yields as high as 92 to 94 percent of the desired ketal sugar. In the case of the conventional sulfuric acid process such a displacement of the equilibrium to give high direct yields is not possible. The present process using ferric chloride or bromide also eliminates the problem of neutralization and the problem of having to dispose of large quantities of inorganic salts.

DETAILED DESCRIPTION

As used herein, the term "lower alkyl" comprehends both straight and branched hydrocarbon groups containing from 1 to 7 carbon atoms, such as methyl, ethyl, propyl, isopropyl, etc. The term "aralkyl" includes phenyl lower alkyl radicals containing from 7 to 13 carbon atoms, such as benzyl, phenethyl, phenpropyl, etc. The term "aryl" denotes phenyl and substituted phenyl groups such as lower alkyl phenyl and lower alkoxy phenyl, including polymethoxy phenyl, polyethoxyy phenyl, ethoxy phenyl, methoxy phenyl. The term "lower alkoxy" denotes lower alkoxy groups containing from 1 to 7 carbon atoms. The term "lower alkylene" includes both straight and branched chain alkylene radicals containing from 2 to 7 carbon atoms such as ethylene, propylene, butylene, etc.

The reaction of this invention is ideally suited to the production of a 2,3:4,6-diketal sorbose such as 2,3:4,6-diacetone sorbose. This reaction can be illustrated in the following manner:

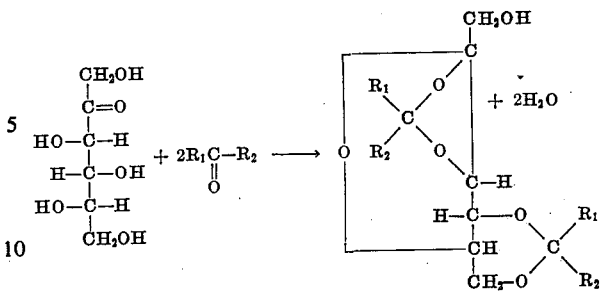

wherein $R_1$ and $R_2$ are as above.

In accordance with an embodiment of this invention when Z in the compound of formula I above, is equal to 0, then the compound of formula I is a sugar alcohol of the formula

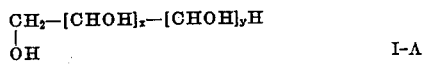    I-A wherein $x$ and $y$ are as above.

When the compound of formula I–A is reacted with the compound of formula II in accordance with the process of this invention, a ketal is produced in high yields by utilizing only small or catalytic quantities of ferric chloride or ferric bromide.

In accordance with another embodiment of this invention when $z$ in formula I above is 1, the compound of formula I above is a sugar. In this case, the compound of formula I above has the following formula:

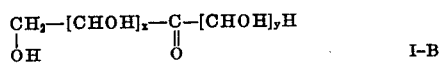    I-B wherein $x$ and $y$ are as above.

When the compound of formula I–B is reacted with the compound of formula II in accordance with this invention, a ketal is produced in high yields utilizing only small or catalytic quantities of ferric chloride or bromide.

Among the sugars of formula I above which can be utilized in accordance with this invention are included ribose, fructose, glucose, arabinose, mannose, erythrose, sorbitol, heptose, hexatol, mannitol, pentitol, etc.

In carrying out the conversion of the compound of formula I above to the ketal, the ferric chloride or bromide catalyst can be utilized in amounts as low as 0.1 percent by weight, based upon the weight of the sugar of formula I above, to produce the compound of the ketal in yields as high as 93 percent. In order to produce the aforementioned beneficial results of this invention, the ferric chloride can be present in the reaction mixture in an amount of from about 0.1 percent to about 10 percent by weight, based upon the weight of the sugar of formula I above. Amounts greater than 10 percent by weight of ferric chloride or bromide catalyst can be utilized without deleteriously effecting the beneficial results of this invention. However, since no advantage is accomplished by utilizing amounts of ferric chloride or bromide greater than 10 percent by weight of the compound of formula I above, these high amounts are seldom utilized. Furthermore, in accordance with this invention, it has been found that the ferric chloride or bromide provides a means whereby the aforementioned reaction takes place without utilizing large excesses of catalysts, such as is necessary when other catalysts are utilized. However, if desired, a large excess of ferric chloride or bromide, i.e., amounts of 20 percent by weight or greater, can be utilized in the reaction medium.

In carrying out the reaction of this invention, any ketone or a aldehyde of the formula II above can be utilized. Among the aldehydes or ketones which are generally utilized in the process of this invention are included formaldehyde, methylethyl-ketone, benzaldehyde, benzyl-methyl-ketone, dibenzylketone, cycloheptanone, cyclohexanone, etc. The preferred compound of formula II which is utilized in accordance with this invention is acetone.

The reaction of this invention can be carried out utilizing the compound of formula II above as a solvent. However, if desired, a conventional inert organic solvent can be utilized in carrying out this reaction. Any conventional inert organic solvent can be present in this reaction. Among the conventional inert organic solvents which may be present, if desired, are included benzene, toluene, hexane, etc.

In carrying out this reaction, the conditions of temperature and pressure should be adjusted so as to remove the water formed during the reaction. In carrying out this reaction, temperatures of from about 0° to about 100° C. can be utilized provided that the pressure is adjusted so that water formed during the reaction can be removed from the reaction medium. Generally, it is preferred to utilize a temperature of from about 20° to 40° C. and a vacuum of from 25 mm. Hg. to 400 mm. However, atmospheric pressure and reflux temperature of the reaction medium can be utilized.

In carrying out the reaction of this invention, at least 1 mole of the ketone or aldehyde of formula II can be reacted with 1 mole of the sugar of formula I. If it is desired to produce a diketal, 2 moles of the compound of formula II are reacted with 1 mole of the compound of formula I. An excess of the compound of formula II can be present in the reaction medium. Furthermore, the conditions of the reaction, such as time and reaction temperature, can be adjusted to allow for the formulation of either monoketal, diketal, triketal, etc. The conditions with regard to time and temperature for forming the desired monoketal, and triketal, etc., are conventional in the art, and, to a large extent, depend upon the reactive hydroxy or carbonyl groups contained within the compound of formula I above.

Any conventional method of removing the water formed during the reaction can be utilized in accordance with this invention. One of these methods is to utilize molecular sieves in the reaction medium. These sieves are capable of adsorbing the water formed during the reaction. Another means of carrying out this reaction is by distilling the water-acetone mixture formed during this reaction and passing the condensed distillate through molecular sieves to remove water from the distillate. The distillate, with the water removed, can be then recycled back into the reaction mixture.

The term "ketal" as used herein is defined to include any dialkoxy alkane containing compound wherein both alkoxy groups are attached to the same carbon atoms of the alkane moiety. The term "ketal" includes acetals.

The term "ferric chloride" or "ferric bromide" as used throughout this specification includes ferric chloride and ferric bromide in both the anhydrous and hydrated forms.

The following example is illustrative but not limitative of this invention.

EXAMPLE 1

This example is directed to producing 2,3:4,6-diacetone-1-sorbose by means of the process of this invention.

Ten g. of L-sorbose, 100 mg. of anhydrous ferric chloride and 200 ml. of acetone were placed in a 1-liter flask equipped with a stirrer, thermometer, a vapor tube, condenser, and a liquid receiver for receiving the distillate from the condenser.

In the first run given in the table below, the sorbose, acetone and ferric chloride were heated to 56° C. (distillation temperature) for 4 hours. During this period, the acetone and water formed during the reaction were distilled from the flask into the receiver. The rate of distillation was maintained during the reaction at a velocity corresponding to 4 times the volume of the initial reaction mixture per hour. During this period, acetone was continually fed into the reaction medium to constantly maintain the volume in the reaction flask at 200 ml.

The second and third runs were carried out in the same manner as the first run except that the temperature was maintained at 40° C. and 30° C. respectively. The pressure was adjusted to a sufficient vacuum during these runs to produce reflux.

The fourth run was carried out in the same manner as the first run except that 100 ml. of acetone was utilized. Acetone was fed into the reaction flask to maintain a volume of 100 ml. during the reaction.

After the reaction, the 2,3:4,6-diacetone-L-sorbose was recovered by the following procedure:

The solution remaining in the flask was neutralized to a pH of about 8 by the addition of an aqueous sodium carbonate solution. After neutralization, the excess solvent was removed from the solution by distillation.

The residue remaining in the flask was dissolved in toluene and extracted with 3 portions of 0.05 M sodium hydroxide. The aqueous solutions were combined and extracted with 5 portions of toluene. The toluene extract was evaporated to give 2,3:4,6-diacetone-L-sorbose. The yields for the four runs are given in the following table:

| Run | Temperature | Reaction Time (hours) | Yield (percent theoretical) |
| --- | --- | --- | --- |
| 1 | 56° C. | 4 | 91 percent |
| 2 | 40° C. | 7½ | 93 percent |
| 3 | 30° C. | 10 | 93.5 percent |
| 4 | 56° C. | 4½ | 92 percent |

We claim:
1. A process for producing a diketal of the formula:

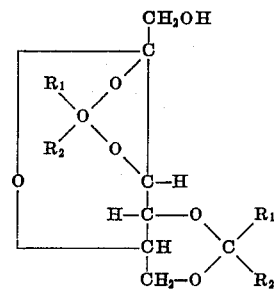

wherein $R_1$ and $R_2$ are selected from the group consisting of hydrogen, lower alkyl, aralkyl, and aryl, and taken together form a lower alkylene radical, comprising reacting sorbose with a compound of the formula:

wherein $R_1$ and $R_2$ are as above, in the presence of ferric chloride or ferric bromide while continuously removing water from the reaction medium during said reaction.

2. The process of claim 1 wherein said ferric chloride or ferric bromide is present in an amount of at least about 0.1 percent by weight, based upon the weight of sorbose.

3. The process of claim 2 wherein ferric chloride or ferric bromide is present in an amount of from about 0.1 percent to 10 percent by weight, based upon the weight of sorbose.

4. The process of claim 1 wherein said water is removed by distillation.

5. A process for producing 2,3:4,6-diacetone-L-sorbose comprising reacting L-sorbose with acetone in the presence of ferric chloride or ferric bromide while continuously removing said water from said reaction medium during said reaction.

6. The process of claim 5 wherein said ferric chloride or ferric bromide is present in an amount of at least 0.1 percent by weight, based upon the weight of said sorbose.

7. The process of claim 6 wherein said ferric chloride or ferric bromide is present in an amount of from about 0.1 percent to 10 percent by weight, based upon the weight of said sorbose.

8. The process of claim 6 wherein said reaction is carried out at a temperature of from about 20° to 40° C. at a pressure of from about 25 mm. Hg. to about 400 mm. Hg., and the water is removed by distillation.

9. A process of preparing a ketal sugar comprising reacting a sugar of the formula:

$$\text{CH}_2\text{—[CHOH]}_x\text{[—C—]}_z\text{—[CHOH]}_y\text{H}$$
$$\quad\ \ |\qquad\qquad\quad\ \ \|$$
$$\quad\ \ \text{OH}\qquad\qquad\quad\ \text{O}$$

wherein $x$ is an integer from 1 to 5 and $y$ and $z$ are integers from 0 to 1; with a compound of the formula:

$$R_1\text{—C—}R_2$$
$$\quad\ \ \|$$
$$\quad\ \ \text{O}$$

wherein $R_1$ and $R_2$ are selected from the group consisting of hydrogen, lower alkyl, aralkyl and aryl, and taken together from a lower alkylene radical, in the presence of ferric chloride or ferric bromide while continuously removing water from the reaction medium during said reaction.

10. The process of claim 9 wherein said sugar has the formula:

$$\text{CH}_2\text{—[CHOH]}_x\text{—[CHOH]}_y\text{H}$$
$$\quad\ \ |$$
$$\quad\ \ \text{OH}$$

wherein $x$ is an integer from 1 to 5 and $y$ is an integer from 0 to 1.

11. The process of claim 10 wherein ferric chloride or ferric bromide is present in an amount of from about 0.1 percent to 10 percent by weight, based upon the weight of sugar.

12. The process of claim 10 wherein said water is removed by distillation.

13. The process of claim 9 wherein said sugar has the formula:

$$\text{CH}_2\text{—[CHOH]}_x\text{—[CHOH]}_y\text{H}$$
$$\quad\ \ |$$
$$\quad\ \ \text{OH}$$

wherein $x$ is an integer from 1 to 5 and $y$ is an integer from 0 to 1.

14. The process of claim 13 wherein ferric chloride or ferric bromide is present in an amount of from about 0.1 percent to 10 percent by weight, based upon the weight of sugar.

15. The process of claim 13 wherein said water is removed by distillation.

* * * * *

UNITED STATES PATENT OFFICE
CERTIFICATE OF CORRECTION

Patent No. 3,622,560  Dated November 23, 1971

Inventor(s) Nathan Chadwick Hindley, Michael James O'Leary and Niklaus Halder

It is certified that error appears in the above-identified patent and that said Letters Patent are hereby corrected as shown below:

Column 6, line 15 of claim 13

"$CH_2-[CHOH]_x-[CHOH]_yH$"
$\phantom{CH_2-}|$
$\phantom{CH_2}OH$ should be $CH_2-[CHOH]_x-\underset{\parallel}{C}-[CHOH]_yH$
$|\phantom{CH_2-[CHOH]_x-C-[CHOH]}$
$OH\phantom{CH_2-[CHOH]_x}O$ Signed and sealed this 25th day of April 1972.

(SEAL)
Attest:

EDWARD M. FLETCHER, JR.  ROBERT GOTTSCHALK
Attesting Officer  Commissioner of Patents